United States Patent [19]

Jansons et al.

[11] Patent Number: 4,593,086

[45] Date of Patent: Jun. 3, 1986

[54] PREPARATION OF AROMATIC KETONE-SULFONE COPOLYMERS

[75] Inventors: Viktors Jansons, Los Gatos; Heinrich C. Gors, Mountain View, both of Calif.

[73] Assignee: Raychem Corporation, Menlo Park, Calif.

[21] Appl. No.: 659,742

[22] Filed: Oct. 11, 1984

Related U.S. Application Data

[63] Continuation-in-part of Ser. No. 594,503, Mar. 29, 1984, which is a continuation-in-part of Ser. No. 481,083, Mar. 31, 1983, abandoned, and a continuation-in-part of Ser. No. 648,119, Sep. 6, 1984, abandoned.

[51] Int. Cl.$^4$ ............................................. C08G 75/23
[52] U.S. Cl. ..................... 528/173; 528/125; 528/126; 528/128; 528/175; 528/176; 528/179; 528/180; 528/181; 528/193; 528/194
[58] Field of Search ............... 528/173, 175, 125, 126, 528/128, 176, 179, 180, 181, 193, 194

[56] References Cited

U.S. PATENT DOCUMENTS

| | | | |
|---|---|---|---|
| 3,441,538 | 4/1969 | Marks | 528/173 |
| 3,442,857 | 5/1969 | Thornton | 528/173 |
| 4,108,837 | 8/1978 | Johnson et al. | 528/173 |
| 4,252,937 | 2/1981 | Marvel et al. | 528/173 |
| 4,324,881 | 4/1982 | Blinne et al. | 528/173 |
| 4,356,292 | 10/1982 | Sankaran et al. | 528/173 |
| 4,356,298 | 10/1982 | Marvel et al. | 528/173 |
| 4,396,755 | 8/1983 | Rose | 528/173 |
| 4,398,020 | 8/1983 | Rose | 528/173 |
| 4,499,258 | 2/1985 | Marvel et al. | 528/173 |

FOREIGN PATENT DOCUMENTS 1016245 1/1966 United Kingdom .
1086021 10/1967 United Kingdom .

*Primary Examiner*—Lester L. Lee
*Attorney, Agent, or Firm*—Edith A. Rice; Herbert G. Burkard

[57] ABSTRACT

A process for producing aromatic ketone-sulfone copolymers which comprises polymerizing appropriate monomers by a Friedel-Crafts polymerization reaction using a Lewis acid catalyst. A controlling agent such as a Lewis base is added to the reaction medium. The reaction medium comprises, for example, aluminum trichloride as the Lewis acid, an organic Lewis base such as N,N-dimethylformamide or an inorganic Lewis base such as sodium or lithium chloride as the controlling agent, and a diluent such as methylene chloride or 1,2-dichloroethane. The amount of Lewis acid, the amount of Lewis base, the temperature of the reaction and the monomer to diluent molar ratio are varied depending on the monomer system to obtain melt-processable, high molecular weight, substantially linear polymers, for example prepared from copolymerization of p-phenoxybenzoyl chloride and p-phenoxybenzenesulfonyl chloride or of terephthaloyl chloride, 1,4-benzenedisulfonyl chloride and diphenyl ether, or of like monomers.

8 Claims, No Drawings

PREPARATION OF AROMATIC KETONE-SULFONE COPOLYMERS

This application is a continuation-in-part of U.S. application Ser. No. 594,503 filed Mar. 29, 1984 which in turn is a continuation-in-part of U.S. application Ser. No. 481,083 filed Mar. 31, 1983 now abandoned, and a continuation-in-part of Ser. No. 648,119 filed Sept. 6, 1984 and now abandoned. The disclosures of these applications are incorporated herein by reference.

BACKGROUND OF THE INVENTION

This invention relates to a method of preparing aromatic ketone-sulfone copolymers and in particular to an electrophilic polymerization process for preparing such polymers.

Aromatic polyketones and aromatic polysulfones, in particular, the all para-linked ones, possess many desirable properties, for example, high temperature stability, mechanical strength, and resistance towards common solvents. A general method for preparing such polymers is an electrophilic synthesis in which an aryl ketone or sulfone linkage is formed in the polymerization step. This invention is directed to an electrophilic synthesis for preparing aromatic copolymers having both ketone and sulfone groups, in particular para-linked aromatic ketone-sulfone copolymers.

In such an electrophilic synthesis, the polymerization step involves the formation of an aryl ketone or sulfone group from a carboxylic acid or sulfonic acid halide and an aromatic compound containing an aromatic carbon bearing an activated hydrogen atom, i.e. a hydrogen atom displaceable under the electrophilic reaction conditions. The monomer system employed in the polymerization can be, for example, (a) two aromatic compounds, one containing both a carboxylic acid halide and an activated hydrogen atom on an aromatic carbon for example, p-phenoxybenzoyl chloride and the other both a sulfonic acid halide and an activated hydrogen on an aromatic carbon, for example, p-phenoxybenzenesulfonyl chloride, or (b) a three-component system of a dicarboxylic acid dihalide, a sulfonic acid dihalide, and an aromatic compound containing two activated hydrogen atoms, for example, terephthaloyl chloride, 1,4-benzendisulfonyl dichloride, and diphenyl ether. Various combinations of such monomers can be used to prepare desired copolymers.

Electrophilic polymerization of this type is often referred to as Friedel-Crafts polymerization. Typically, such polymerizations are carried out in a reaction medium comprising the reactant(s), a catalyst, such as anhydrous aluminum trichloride, and solvent such as methylene chloride, carbon disulfide, nitromethane, nitrobenzene, or ortho-dichlorobenzene. Because the carbonyl and sulfonyl groups of the reactant(s) and products complex with aluminum trichloride and thereby deactivate it, the aluminum trichloride catalyst is generally employed in an amount greater than one equivalent for each equivalent of carbonyl and sulfonyl groups in the reaction medium. Other inorganic halides such as ferric chloride may be employed as the catalyst.

Such Friedel-Crafts polymerizations generally have produced an intractable reaction product difficult to remove from the reaction vessel and purify. Further, such processes have tended to produce polymer of undesirably low molecular weight and/or of poor thermal stability. The all para-linked aromatic ketone-sulfone copolymers containing a relatively high ketone content have been particularly difficult to prepare under such Friedel-Crafts conditions. One factor that appears to contribute to the unsatisfactory results reported in the literature is that the para-linked polymers, and in particular all para-linked polymers having a high ketone content, tend to be more highly crystalline than other members of this polymer family and are therefore generally more insoluble in the reaction media typically used in such Friedel-Crafts reactions. This tends to result in the premature precipitation of the polymer in low molecular weight form. Also, side reactions, particularly at the ortho position of activated aromatic rings can result in a polymer that is branched and/or is more likely to cross-link at elevated temperatures such as those required for melt processing the polymer. It is generally recognized that in Friedel-Crafts reactions, ortho substitution of the polymer is more likely to occur if the reaction is conducted at elevated temperatures and/or for a relatively long reaction time. U.S. Pat. Nos. 3,065,205 to Bonner, 3,767,620 to Angelo et al, 3,516,966 to Berr, 3,791,890 to Gander et al, 4,008,203 to Jones and U.K. Pat. Nos. 971,227 and 1,086,021 both to Imperial Chemical Industries, Limited, disclose the preparation of poly(arylene ketones) by Friedel-Crafts polymerization and generally acknowledge some of the difficulties in producing tractable, melt-stable polymers. For example, Gander et al provide a method of producing the polymers in granular form by special treatment of the reaction mixture before gellation can occur and Angelo et al provide a method of treating the polymer to reduce undesired end groups which result from side reactions during polymerization and which cause thermal instability of the polymer.

To overcome the disadvantages encountered in producing poly(arylene ketones) by the above described Friedel-Crafts polymerization, it has been proposed to use boron trifluoride catalyst in anhydrous hydrogen fluoride. See for example, U.S. Pat. Nos. 3,441,538 to Marks, 3,442,857 to Thornton, 3,953,400 to Dahl, and 3,956,240 to Dahl et al. This general process has been used commercially to produce polymer of the desired high molecular weight and thermal stability. However, the use of boron trifluoride and hydrogen fluoride requires special techniques and equipment making this process difficult to practice on a commercial scale.

We have now discovered an improved process for the production of aromatic ketone-sulfone copolymers by an electrophilic synthesis which results in high molecular weight, thermally stable polymers using reaction media that are readily handled on a commercial scale. The process of this invention provides a high reaction rate which enables the reaction to be carried out at relatively low temperatures over a relatively short period of time. Further, the polymer is maintained in the reaction medium, for example in solution or in a reactive gel state, until high molecular weight polymer is obtained. Further, the polymer produced is essentially linear with little, if any, ortho substitution of the aromatic rings in the polymer backbone. Since the process of this invention maintains the polymer in solution or in a more tractable state, recovery and purification of the polymer is greatly facilitated.

SUMMARY OF THE INVENTION

In accordance with the process of this invention, aromatic polymers having ketone and sulfone groups are prepared by Friedel Crafts polymerization of a monomer system selected from the group consisting of (I) at least one self polymerizing monomer having a carboxylic acid halide group and an aromatic hydrogen activated towards electrophilic substitution and at least one self polymerizing monomer having a sulfonic acid halide group and an aromatic hydrogen activated towards electrophilic substitution;

(II) at least one aromatic dicarboxylic acid dihalide and at least one aromatic disulfonic acid dihalide together with a substantially stoichiometric amount of at least one aromatic aromatic compound having two such activated hydrogens; and (III) combinations of the above;

in a reaction medium comprising (A) a Lewis acid in an amount of about one equivalent per equivalent of carbonyl groups present plus one equivalent per equivalent of Lewis base, plus an amount effective to act as a catalyst for the polymerization;

(B) a Lewis base in an amount from 0.01 to 4 equivalents per equivalent of acid halide groups present in the monomer system; and (C) a non-protic diluent in an amount from 0 to 93 percent by weight, based on the weight of the total reaction mixture, subject to the proviso that molar ratio of carboxylic acid halide groups to sulfonic acid halide groups in the monomers is at least about 3.

DETAILED DESCRIPTION OF THE INVENTION

The process of this invention can be practiced with two general types of monomer systems. The first comprises at least one self polymerizing monomer having a carboxylic acid halide group and an aromatic hydrogen activated towards electrophilic substitution and at least one self polymerizing monomer having a sulfonic acid halide group and an aromatic hydrogen activated towards electrophilic substitution. Such a monomers are called EN monomers because they have both an electrophilically reactive group (the carboxylic or sulfonic acid halide) and a nucleophlically reactive group (the aromatic ring bearing the activated hydrogen).

Illustrative but not exhaustive examples of EN monomers having carboxylic acid halide groups are: p-phenoxybenzoyl chloride, diphenylmethane-4-carbonyl chloride, 4-(4-phenoxyphenoxy)benzoyl chloride, 4-phenoxybenzophenone-4'-carbonyl chloride, 4-(4-biphenyloxy)benzoyl chloride, 4-phenoxybiphenyl-4'-carbonyl chloride, and dibenzofuran-2-carbonyl chloride.

Illustrative but not exhaustive examples of EN monomers having sulfonic acid halide groups are: p-phenoxybenzene sulfonyl chloride, diphenylmethane-4-sulfonyl chloride, 4-(4-phenoxyphenoxy)benzenesulfonyl chloride, 4-phenoxybenzophenone-4'-sulfonyl chloride, 4-(4-biphenyloxy)benzenesulfonyl chloride, 4-phenoxybiphenyl-4'-sulfonyl chloride, and dibenzofuran-2-sulfonyl chloride.

The second monomer system comprises at least one aromatic dicarboxylic acid dihalide and at least one aromatic disulfonic acid dihalide together with a substantially stoichiometric amount of at least one aromatic aromatic compound having two such activated hydrogens. The dicarboxylic and disulfonic acid dihalides are called EE monomers because they contains two electrophilically reactive groups. The activated hydrogen containing aromatic compound is called an NN monomer because it contains two nucleophilically reactive groups.

Illustrative but not exhaustive examples of EE monomers having dicarboxylic acid halide groups are: terephthaloyl chloride, isophthaloyl chloride, diphenylmethane-4,4'-dicarbonyl dichloride, benzophenone-4,4'-dicarbonyl dichloride, diphenyl ether-4,4'-dicarbonyl dichloride, diphenyl-4,4'-dicarbonyl dichloride, naphthalene-2,6-dicarbonyl dichloride, naphthalene-1,4-dicarbonyl dichloride, and diphenylsulfone-4,4'-dicarbonyl dichloride.

Illustrative but not exhaustive examples of EE monomers having two sulfonic acid halide groups are: benzene-1,4-disulfonyl dichloride, benzene-1,3-disulfonyl dichloride, diphenylmethane-4,4'-disulfonyl dichloride, benzophenone-4,4'-disulfonyl dichloride, diphenyl ether-4,4'-dicarbonyl dichloride, diphenyl-4,4'-disulfonyl dichloride, naphthalene-2,6-disulfonyl dichloride, naphthalene-1,4-disulfonyl dichloride, and diphenylsulfone-4,4'-disulfonyl dichloride.

Illustrative but not exhaustive examples of NN monomers are: diphenyl ether, 1,4-diphenoxybenzene, 4,4'-diphenoxybenzophenone, 4-phenoxybiphenyl, 4,4'-diphenoxybiphenyl, 4,4'-bis(4-phenoxyphenoxy)benzophenone, 1,4-bis(4-phenoxyphenoxy)benzene, 4,4'-diphenoxydiphenylsulfone, dibenzofuran, and dibenzo-p-dioxin.

It is to be understood that in the above examples of suitable EN, EE, and NN monomers for which different substitution patterns are possible, the all-para ones were generally recited as a matter of convenience and as a reflection of the aforementioned preference for all-para linked polymers. However, where desirable, for example, for reducing the crystallinity of the resulting polymer, the meta-substituted variants of the these monomers are also suitable. It is also to be understood that while the carboxylic and sulfonic acid chlorides were specifically recited, the corresponding bromides and fluorides are also suitable.

Many combinations of monomers are possible. For example, two or more different carboxylic acid halide EN comonomers may be copolymerized with a single sulfonic acid halide EN comonomer, or vice versa. Or one carboxylic acid EE comonomer and two or more sulfonic acid EE comonomers may be copolymerized with a substantially stoichiometric amount of an NN comonomer. Or even one of more EN monomers can be polymerized with an EE and and NN monomer, provided EE and NN are present in substantially stoichiometric amounts.

Generally, the molar ratio of carboxylic acid halide groups to sulfonic acid halide groups in the comonomers used should be at least about 3.

As with other electrophilic polymerizations of this type, the monomer(s) used should be relatively free of any impurities which would interfere with the polymerization.

As used in this specification, a "hydrogen activated towards electrophilic substitution" is a hydrogen bonded to an aromatic carbon atom and displaceable by an acyl or sulfonyl group under the well-known conditions for Friedel Crafts acylation to occur. In particular, it is displaceable under the reaction conditions of this invention. A hydrogen is activated for a Friedel Crafts reaction by the presence of an electron donating group ortho or para to it. For the purposes of this invention, the electron donating substituent should exert an electron donating effect corresponding to a sigma-plus(- para) value of −0.10 or lesser (i.e., more negative). A particularly desirable electron donating substituent is a para ether group, as in phenoxy. Where more than one substituent is involved, the requirement is that their net effect corresponds to −0.10 or lesser. A discussion on sigma-plus(para) values may be found in Gordon and Ford, "The Chemist's Companion: A Handbook of Practical Data, Techniques, and References", John Wiley & Sons, 1972, page 144 ff.

Those skilled in the art will readily realize that an electron donating substituent enhances the Friedel Crafts reactivity of hydrogens situated ortho and para to it, but that only one generally reacts in a Friedel Crafts acylation or sulfonylation, because upon the introduction of the acyl or sulfonyl group it tends to exert a deactivating effect which inhibits the other hydrogens from reacting. Thus, for stoichiometric purposes in this specification, a group such as phenoxy ($C_6H_5O-$) is deemed to have one activated hydrogen, although the ether group exerts an electron donative effect on one para and two ortho hydrogens. It has been our experience that the para hydrogen is the one which is generally replaced, particularly where the polymerization is run in the presence of a Lewis acid and a complex between a Lewis acid and a Lewis base, as taught hereinafter.

The process for preparing the polymers of the instant invention comprises the use of a reaction medium comprising free Lewis acid and a complex between a Lewis acid and a Lewis base and optionally a diluent. The term "complex" is used to mean any product of the reaction between the Lewis acid and the Lewis base. A diluent is employed if the complex is a solid at polymerization temperatures and can be present, if desired, when the complex is liquid.

The term "Lewis acid" is used herein to refer to a substance which can accept an unshared electron pair from another molecule. Lewis acids which can be used in the practice of this invention include, for example, aluminum trichloride, aluminum tribromide, antimony pentachloride, antimony pentafluoride, indium trichloride, gallium trichloride, boron trichloride, boron trifluoride, zinc chloride, ferric chloride, stannic chloride, titanium tetrachloride, and molybdenum pentachloride. The use of substantially anhydrous aluminum trichloride as the Lewis acid is preferred.

The amount of Lewis acid used in the practice of this invention varies depending on the particular monomers and reaction medium selected. In all instances at least about one equivalent of Lewis acid per equivalent of carbonyl groups present in the monomer system is used plus an amount effective to act as a catalyst for the reaction (also referred to herein as a catalytic amount). Generally a catalytic amount added is from about 0.05 to about 0.3 equivalents of Lewis acid per equivalent of acid halide in the reaction mixture. Additional amounts of Lewis acid are also required depending on the nature of the monomers and the reaction conditions in a manner as set forth below. Further, if a comonomer containing other basic species is used, additional Lewis acid may be required.

In a preferred embodiment of the invention, the reaction is controlled by the addition of a controlling agent which, inter alia, suppresses undesirable side reactions, particularly alkylation and/or ortho substitution of activated aryl groups. Suppression of side reactions results in a polymer that can that will be more readily melt processable because it will be less likely to degrade or cross-link when subjected to elevated temperatures, e.g. temperatures above its melting point. For a polymer of this type to be suitable for melt processing, it must be able to withstand the processing temperatures for the required processing time. Typically these conditions require that the polymer can withstand temperatures up to about 30 C. above the melting or softening point of the polymer for periods of at least 30 minutes, preferably at least 60 minutes and most preferably at least 90 minutes, without undesired gel formation or substantial change in inherent viscosity.

Preferred controlling agents for the polymerization are Lewis bases. The term "Lewis base" is used herein to refer to a substance capable of donating an unshared electron pair to a Lewis acid. Thus, the Lewis base forms a complex with the Lewis acid used in the reaction medium. It has been found that Lewis bases which form a 1:1 complex having a heat of association at least about that of diphenyl ether with the Lewis acid are preferred. For example, where aluminum trichloride is the Lewis acid the Lewis base used should form a 1:1 complex having a heat of association of at least about 15 kcal/mole, preferably at least about 20 kcal/mole and most preferably at least about 30 kcal/mole. While the heats of association are for a 1:1 Lewis acid/Lewis base complex consisting solely of these two components, the actual complex formed in the reaction medium need not be a 1:1 complex. A discussion on heats of association for Lewis acid/Lewis base complex is found in J. Chem Soc. (A), 1971, pages 3132–3135 (D. E. H. Jones et al) The Lewis base used should not be an acylating, alkylating or arylating agent nor should it be acylatable under the reaction conditions. Mixtures of two or more Lewis bases can be used if desired. The Lewis base used as a controlling agent in the practice of this invention is an additional component added to the reaction medium. This does not include basic species formed in situ during the reaction.

Typical Lewis bases which can be employed include, for example, amides, amines, esters, ethers, ketones, nitriles, nitro compounds, phosphines, phosphine oxides, phosphoramides, sulfides, sulfones, sulfonamides, sulfoxides and halide salts.

Examples of specific organic Lewis bases that can be used in the practice of this invention are acetone, benzophenone, cyclohexanone, methyl acetate, ethylene carbonate, N-methyl-formamide, acetamide, N,N-dimethylacetamide, N-methylpyrrolidone, urea, tetramethylurea, N-acetylmorpholine, dimethyl sulfoxide, N,N-dimethylformamide, diphenyl sulfone, N,N-dimethylmethane-sulfonamide, phosphoryl chloride, phenylphosphonyl chloride, pyridine-N-oxide, triphenylphosphine oxide, trioctylphosphine oxide, nitropropane, nitrobenzene, benzonitrile, n-butyronitrile, methyl ether, tetrahydrofuran, dimethyl sulfide, trimethylamine, N, N,N',N'-tetramethylethylenediamine, N,N-dimethyldodecylamine, imidazole, pyridine, quinoline, isoquinoline, benzimidazole, 2,2'-bipyridine, o-phenanthroline, 4-dimethylaminopyridine, and the like. In addition to covalent organic compounds, suitable Lewis bases include inorganic salts which can form complexes with Lewis acids, for example, chlorides, such as trimethylammonium chloride, tetramethylammonium chloride, sodium chloride or lithium chloride, perchlorates, trifluoro-methanesulfonates and the like.

Preferred Lewis bases for the reaction medium of this invention are N-methylformamide, N,N-dimethyl-formamide, N,N-dimethylacetamide, 1-methyl-2-pyrrolidone, tetramethylene sulfone (also known as sulfolane), n-butyroni-trile, dimethyl sulfide, imidazole, acetone, benzophenone, trimethylamine, trimethylamine hydrochloride, tetramethylammonium chloride, pyridine-N-oxide, 1-ethylpyridinium chloride, lithium chloride, lithium bromide, sodium chloride, sodium bromide, potassium chloride, potassium bromide and mixtures thereof.

The amount of Lewis base present should be from 0.01 to about 4 equivalents per equivalent of acid halide groups present in the monomer system. Preferably at least about 0.05 and most preferably at least about 0.5 equivalents of Lewis base per equivalent of acid halide groups present should be used. Amounts greater than 4 equivalents could be employed, if desired. However, no additional controlling effect is usually achieved by adding larger amounts. Thus, it is preferred to use no more than about 4 equivalents and generally about 2 equivalents. The particular amount of Lewis base added depends to a certain extent on the nature of the monomers present.

The temperature at which the reaction is conducted can be from about −50 C. to about +150 C. It is preferred to start the reaction at lower temperatures, for example at about −50 to about −10 C. particularly if the monomer system contains highly reactive monomers. After reaction has commenced, the temperature can be raised if desired, up to 150 C. or even higher, for example, to increase the rate of reaction. It is generally preferred to carry out the reaction at temperatures in the range of between about −30 C. and +25 C. (room temperature).

While it is not understood exactly how the Lewis base acts to control the reaction, it is believed that one or more of the following factors may be involved. The Lewis acid/Lewis base complex appears to influence the catalytic activity of Lewis acid, so as to substantially eliminate all ortho or meta acylation.

If a diluent such as methylene chloride or dichloroethane is used, is the Lewis acid/Lewis base complex substantially reduces the tendency of the diluent to act as an alkylating agent by competing with the diluent for available Lewis acid and thereby suppressing alkylation of the polymer. Alkylation of the polymer in the para position caps the reaction while alkylation in the ortho position introduces undesired reactive sites in the polymer chain which can lead to branching or cross-linking.

A non-protic diluent can also be employed, if desired. Advantageously, the diluent should dissolve the Lewis acid/Lewis base complex and the resulting polymer-/Lewis acid complex but this is not an essential requirement of the diluent. It should also be relatively inert toward Friedel-Crafts reactions.

The diluent is used in an amount from 0 to about 93% by weight, based on the weight of the total reaction mixture. As is known in reactions of this type, the reactions can be run neat, that is without the presence of a diluent. This is true for the process of this invention whether or not a Lewis base is used. As discussed in more detail below, it has been found that the monomer to diluent molar ratio can contribute to control of the reaction to yield the desired product.

Use of an alkylating or acylating diluent can lead to undesired side reactions as mentioned above. When such solvents are employed control of the reaction by techniques taught in this specification suppresses such alkylation or arylation. The result is a thermally stable, essentially linear polymer.

If desired, the molecular weight of the polymer, the degree of branching and amount of gelation can be controlled by the use of, for example, capping agents as described in U.S. Pat. No. 4,247,682 to Dahl, the disclosure of which is incorporated herein by reference. The molecular weight of the polymer can also be controlled by a reaction utilizing a two-monomer system as described above, by employing a slight excess of one of the monomers.

Capping agents, when employed, are added to the reaction medium to cap the polymer on at least one end of the chain. This terminates continued growth of that chain and controls the resulting molecular weight of the polymer, as shown by the inherent viscosity of the polymer. Judicious use of the capping agents results in a polymer within a selected narrow molecular weight range, decreased gel formation during polymerization, and decreased branching of the polymer chains and increases melt stability. Both nucleophilic and electrophilic capping agents can be used to cap the polymer at each end of the chain.

Preferred nucleophlic capping agents are 4-phenoxybenzophenone, 4-(4-phenoxyphenoxy)benzophenone, 4,4′-bisphenoxybenzophenone, and the like.

Typical electrophilic capping agents are compounds of the formula

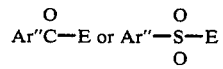

wherein Ar″ is phenyl, 3-chlorophenyl, 4-chlorophenyl, 4-cyanophenyl, 4-methylphenyl or an aromatic group substituted with an electron withdrawing substituent and E is halogen or other leaving group. Preferred electrophilic capping agents include benzoyl chloride, benzenesulfonyl chloride and the like.

Decomplexation of the polymer from the catalyst can be accomplished by treating the reaction mixture with a decomplexing base after completion of polymerization. The base can be added to the reaction medium or the reaction medium can be added to the base. The decomplexing base must be at least as basic towards the Lewis acid as the basic groups on the polymer chain. Such decomplexation should be effected before isolation of the polymer from the reaction mixture.

The amount of decomplexing base used should be in excess of the total amount of bound (complexed) and unbound Lewis acid present in the reaction mixture and is preferably twice the total amount of Lewis acid. Typical decomplexing bases which can be used include water, dilute aqueous hydrochloric acid, methanol, ethanol, acetone, N,N-dimethylformamide, N,N-dimethylacetamide, pyridine, dimethyl ether, diethyl ether, tetrahydrofuran, trimethylamine, trimethylamine hydrochloride, dimethyl sulfide, tetramethylenesulfone, benzophenone, tetramethylammonium chloride, isopropanol and the like. The decomplexed polymer can then be removed by conventional techniques such as adding a nonsolvent for the polymer which is a solvent for or miscible with the Lewis acid/Lewis base complex and the Lewis acid; spraying the reaction medium into a non-solvent for the polymer; separating the polymer by filtration; or evaporating the volatiles from the reaction medium and then washing with an appropriate solvent to remove any remaining base/catalyst complex and diluent from the polymer. A method for removing the catalyst residue is described in U.S. Pat. No. 4,237,884, the disclosure of which is incorporated by reference.

The following example illustrates the preparation of the polymers of this invention. It is to be understood that other reactants, reaction media, and monomers within the scope of the teaching of this invention can be employed, if desired.

Inherent viscosity refers to the mean inherent viscosity as determined according to the method of Sorenson et al., "Preparative Methods of Polymer Chemistry," 2nd Ed., Interscience (1968), p. 44. (c=0.1 g of polymer dissolved in 100 mL of concentrated sulfuric acid at 25 C., unless noted otherwise.)

EXAMPLE

The following general procedure was followed.

Lithium chloride and aluminum chloride were weighed into a 100 mL reaction flask in a dry box. 1,2-Dichloroethane (DCE) (approximately 4 mL) was added. The flask was sealed with a rubber septum and placed in a shaking water bath at 20 C. for at least 45 min.

p-Phenoxybenzoyl chloride ("ketone monomer") and p-phenoxybenzenesulfonyl chloride ("sulfone monomer") were weighed, also in a dry box, into another flask and dissolved in DCE, with stoppering to protect against moisture. The solution of monomers was then transferred by syringe into the reaction flask. The syringe and the monomer flask were rinsed 3 times with more DCE to ensure quantitative transfer. The total volume of DCE used for the preparation of the monomer solution and the rinses was about 4 mL.

The polymerization was permitted to proceed overnight (at least 16 hrs) in the shaker. At the end of this period the polymerization mixture usually had set up as a gel. Occasionally phase separation into a gel and a supernatant clear orange-red liquid occurred.

The polymer was isolated by shearing the reaction mixture in a blendor with methanol, extracting in a Soxhlet extractor with more methanol for 16 hrs, and then drying in a vacuum oven. The amounts of monomers and reagents and the inherent viscosities of the resulting polymers are given in the Table which follows.

| Ketone monomer, g (mmole) | Sulfone monomer, g (mmole) | Lithium chloride, g (mmole) | Aluminum chloride, g (mmole) | Inherent Viscosity |
| --- | --- | --- | --- | --- |
| 2.09 (9.0) | 0.27 (1.0) | 0.21 (5.0) | 3.32 (25.0) | 1.05 |
| 1.86 (8.0) | 0.54 (2.0) | 0.04 (1.0) | 2.43 (18.0) | 0.79 |
| 1.86 (8.0) | 0.54 (2.0) | 0.85 (20.0) | 6.64 (49.8) | 0.72 |
| 1.86 (8.0) | 0.54 (2.0) | 0.08 (2.0) | 2.66 (20.0) | 0.76 |
| 1.86 (8.0) | 0.54 (2.0) | 0.04 (1.0) | 2.43 (18.0) | 0.77 |
| 1.86 (8.0) | 0.54 (2.0) | 0.02 (0.5) | 2.32 (17.0) | 0.76 |
| 2.09 (9.0) | 0.27 (1.0) | 0.85 (20.0) | 6.64 (49.8) | 1.36 |
| 2.09 (9.0) | 0.27 (1.0) | 0.21 (5.0) | 3.32 (25.0) | 1.26 |
| 2.09 (9.0) | 0.27 (1.0) | 0.04 (1.0) | 2.43 (18.0) | 1.19 |
| 2.09 (9.0) | 0.27 (1.0) | 0.02 (0.5) | 2.32 (17.0) | 1.22 |

We claim:

1. A process for producing an aromatic polymer having ketone and sulfone groups comprising polymerizing a monomer system selected from the group consisting of
   (I) at least one self polymerizing monomer having a carboxylic acid halide group and an aromatic hydrogen activated towards electrophilic substitution and at least one self polymerizing monomer having a sulfonic acid halide group and an aromatic hydrogen activated towards electrophilic substitution;
   (II) at least one aromatic dicarboxylic acid dihalide and at least one aromatic disulfonic acid dihalide together with a substantially stoichiometric amount of at least one aromatic compound having two hydrogens activated towards electrophilic substitution; and
   (III) combinations of the above; in a reaction medium comprising
   (A) a Lewis base in an amount from 0.01 to 4 equivalents per equivalent of acid halide groups present in the monomer system;
   (B) a Lewis acid in an amount of about one equivalent per equivalent of carbonyl groups present plus one equivalent per equivalent of Lewis base, plus an amount effective to act as a catalyst for the polymerization; and
   (C) a non-protic diluent in an amount from 0 to 93 percent by weight, based on the weight of the total reaction mixture,
   subject to the proviso that the molar ratio of carboxylic acid halide groups to sulfonic acid halide groups in the monomers is at least about 3.
2. A process in accordance with claim 1 wherein the monomer system comprises p-phenoxybenzoyl chloride and p-phenoxybenzenesulfonyl chloride.
3. A process in accordance with claim 1 wherein the monomer system comprises terephthaloyl chloride, 1,4-benzenedisulfonyl chloride, and diphenyl ether.
4. A process in accordance with claim 1 wherein the Lewis acid is aluminum chloride.
5. A process in accordance with claim 1 wherein the Lewis base is lithium chloride.
6. A process in accordance with claim 1 wherein the Lewis base is N,N-dimethylformamide.
7. A process in accordance with claim 1 wherein a non-protic diluent is used.
8. A process in accordance with claim 1 wherein the non-protic diluent is selected from the group consisting of methylene chloride, o-dichlorobenzene, and 1,2-dichloroethane.

* * * * *